US 8,947,045 B2

(12) United States Patent
Jung et al.

(10) Patent No.: US 8,947,045 B2
(45) Date of Patent: Feb. 3, 2015

(54) METHOD FOR CONTROLLING POWER TRANSMISSION IN WIRELESS POWER TRANSMISSION APPARATUS AND WIRELESS POWER TRANSMISSION APPARATUS THEREOF

(75) Inventors: Chun-Kil Jung, Seoul (KR); Yoon-Sang Kuk, Gwacheon-si (KR)

(73) Assignee: Hanrim Postech Co., Ltd., Suwon-Si (KR)

( * ) Notice: Subject to any disclaimer, the term of this patent is extended or adjusted under 35 U.S.C. 154(b) by 421 days.

(21) Appl. No.: 13/428,206

(22) Filed: Mar. 23, 2012

(65) Prior Publication Data

US 2012/0242285 A1    Sep. 27, 2012

(30) Foreign Application Priority Data

Mar. 23, 2011    (KR) ........................ 10-2011-0026056

(51) Int. Cl.
| | | |
|---|---|---|
| H02J 7/00 | (2006.01) | |
| H02J 7/02 | (2006.01) | |
| H02J 5/00 | (2006.01) | |

(52) U.S. Cl.
CPC .............. *H02J 7/0029* (2013.01); *H02J 7/025* (2013.01); *H02J 5/005* (2013.01)
USPC ....................................................... 320/108

(58) Field of Classification Search
CPC ........ H02J 7/025; H01F 38/14; Y02T 90/122; B60L 11/182; Y02E 60/12
USPC ....................................................... 320/108
See application file for complete search history.

(56) References Cited

U.S. PATENT DOCUMENTS

| | | | |
|---|---|---|---|
| 2004/0017110 A1* | 1/2004 | Yim ................................ | 307/23 |
| 2006/0071632 A1* | 4/2006 | Ghabra et al. ................. | 320/108 |
| 2007/0069687 A1* | 3/2007 | Suzuki ........................... | 320/108 |
| 2010/0327766 A1* | 12/2010 | Recker et al. ................. | 315/291 |
| 2011/0025259 A1* | 2/2011 | Toya et al. .................... | 320/107 |

FOREIGN PATENT DOCUMENTS

| | | |
|---|---|---|
| CN | 101447683 A | 6/2009 |
| CN | 101572421 A | 11/2009 |
| DE | 10-2009-033236 | 1/2011 |
| EP | 2 006 001 | 6/2009 |
| JP | 2007-267578 | 10/2007 |
| JP | 2008-17562 | 1/2008 |
| WO | WO 2010-036980 | 4/2010 |

OTHER PUBLICATIONS

Koran Office Action dated May 21, 2012, issued in corresponding Korean Patent Application No. 10-2011-0026056.
European Search Report dated Aug. 29, 2012, issued in corresponding European Application No. 12160827.7-2010/2503663.
Office Action issued by SIPO on Dec. 4, 2013, in corresponding Chinese Application No. 201210074251.5.

\* cited by examiner

*Primary Examiner* — Arun Williams
(74) *Attorney, Agent, or Firm* — Stein IP, LLC

(57) ABSTRACT

A method for controlling a power transmission in a wireless power transmission apparatus, and a power transmission apparatus thereof. The method includes detecting via an object detecting sensor whether a foreign object is placed on a charging position of the wireless power transmission apparatus during a wireless charging; calculating a power loss of the wireless charging by a controller of the wireless power transmission apparatus if the foreign object is detected by the object detecting sensor; and stopping the wireless charging if the power loss is over a reference value.

13 Claims, 3 Drawing Sheets

METHOD FOR CONTROLLING POWER TRANSMISSION IN WIRELESS POWER TRANSMISSION APPARATUS AND WIRELESS POWER TRANSMISSION APPARATUS THEREOF

CROSS-REFERENCE TO RELATED APPLICATIONS

This application claims the benefit of Korean Application No. 10-2011-0026056, filed Mar. 23, 2011, in the Korean Intellectual Property Office, the disclosure of which is incorporated herein by reference.

BACKGROUND

1. Field

The present application relates to a method for controlling a power transmission in a wireless power transmission apparatus for improving a wireless power efficiency, and a wireless power transmission apparatus thereof.

2. Description of the Related Art

Generally, a battery pack receives electric power from an external charging device and supplies power for operating a portable terminal including a mobile phone and a Personal Digital Assistant (PDA) in a charged state. The battery pack includes a battery cell for charging the electric energy and a circuit for charging and discharging the battery cell, i.e., supplying the electric energy to a portable terminal.

An electrical connection method of the battery pack and the charging device for charging the electric energy to the battery pack used in the portable terminal includes a terminal supplying method for receiving the commercial electricity, converting the commercial electricity into voltage and current corresponding to the battery pack, and supplying the electric energy to the battery pack via the terminal of the corresponding battery pack.

However, when the power is supplied by the terminal supplying method, there is a problem that an instantaneous discharge phenomenon occurs since both terminals of the battery pack and the charging device have different potential differences when the charging device and the battery pack contact with or are separated from each other.

Particularly, when foreign objects are stacked up on one or both of the terminals, a fire may break out due to the instantaneous discharge phenomenon.

There are also problems that the electric energy charged in the battery pack is naturally discharged to the outside via the terminal of the battery pack due to moisture, which causes a reduction in the lifespan and a deterioration in the performance of the battery pack.

Recently, controlling methods and charging systems of a non-contact type using a wireless power transmission method have been suggested to solve the above-mentioned and/or other problems.

There have been studies for increasing the wireless power transmission efficiency as well as stable power reception in the wireless power transmission system.

SUMMARY

An embodiment of the present application provides a method for controlling a power transmission in a wireless power transmission apparatus to improve a wireless power efficiency by detecting a foreign object in a wireless power transmission system and correspondingly controlling power transmission, and a power transmission apparatus thereof.

To achieve the above and/or other embodiments of the present application, provided is a method for controlling a power transmission in a wireless power transmission apparatus, the method including: detecting via an object detecting sensor whether a foreign object is placed on a charging position of the wireless power transmission apparatus during a wireless charging; calculating a power loss of the wireless charging by a controller of the wireless power transmission apparatus if the foreign object is detected by the object detecting sensor; and stopping the wireless charging if the power loss is over a reference value.

The object detecting sensor may be an infrared ray sensor and an infrared ray sensor's sensing angle may be over 120 degrees, and the infrared ray sensor's sensing distance may be over 20 cm.

The method, may further include: detecting whether a wireless power receiving apparatus is placed on the charging position by measuring a phase change or a current value change for a pulse signal transmitted via a primary core of the wireless power transmission apparatus; and starting the wireless charging by transmitting a wireless power signal to the wireless power receiving apparatus.

The operation of detecting whether a wireless power receiving apparatus is placed on the charging position by the measuring of the phase change or the current value change for the pulse signal transmitted via the primary core of the wireless power transmission apparatus, may include: transmitting the pulse signal to a first transmission coil and a second transmission coil of the primary core in turns; measuring the phase change or the current value change of the pulse signal which is generated in one of the first transmission coil and the second transmission coil; and detecting that the wireless power receiving apparatus is placed on one of the first transmission coil and the second transmission coil, based on the phase change or the current value change.

The method, may further include: measuring a heating temperature of the wireless power transmission apparatus; and stopping the wireless charging if the heating temperature is over a reference temperature.

The operation of calculating the power loss of the wireless charging by the controller of the wireless power transmission apparatus if the foreign object is detected by the object detecting sensor, may include calculating the power loss by using charging state information transmitted from the wireless power receiving apparatus.

To achieve the above and/or other embodiments of the present application, another aspect provides a wireless power transmission apparatus, including: a primary core to transmit a wireless power signal and during wireless charging; an object detecting sensor to detect a foreign object during the wireless charging; and a transmission controller to calculate a power loss of the wireless charging if the foreign object is detected by the object detecting sensor during the wireless charging, and to stop the wireless charging if the power loss is over the reference value.

The object detecting sensor may be installed on a protrusion portion formed at one side of the wireless power transmission apparatus.

The apparatus, may further include: an indicator installed on the protrusion portion in order to show that the wireless charging works normally.

The transmission controller may detect whether a wireless power receiving apparatus is placed on the charging position by measuring a phase change or a current value change for a pulse signal transmitted via a primary core of the wireless power transmission apparatus, and to start the wireless charging by transmitting a wireless power signal if the wireless power receiving apparatus is placed on the charging position.

The transmission controller may be transmit the pulse signal to a first transmission coil and a second transmission coil of the primary core in turns, to measure the phase change or the current value change of the pulse signal which is generated in one of the first transmission coil and the second transmission coil, and to detect that the wireless power receiving apparatus is placed on one of the first transmission coil and the second transmission coil, based on the phase change or the current value change.

The apparatus, may further include: a temperature measuring unit to measure a heating temperature in the wireless power transmission apparatus, wherein the transmission controller stops the wireless charging if the heating temperature is over the reference temperature.

According to an exemplary embodiment of the present document, a foreign object existing between the wireless power transmission apparatus and the wireless power receiving apparatus during the wireless charging or before starting the wireless charging may be detected. Accordingly, a wireless power transmission efficiency may be improved by controlling a wireless power transmission, according to the detection or not of the foreign object.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
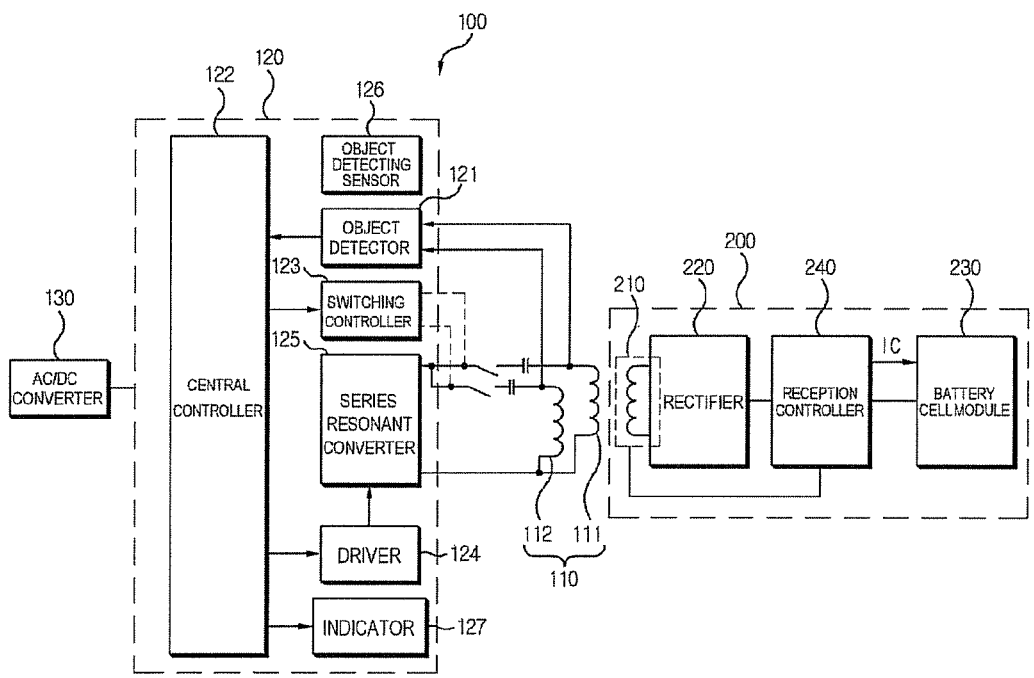
FIG. 1 is a block diagram showing a wireless power transmission system according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A method for selectively controlling a power transmission coil in a wireless power transmission device, and a wireless power transmission device thereof will be described in detail with reference to the accompanying drawings. The suffixes "module", "-er" and "-or" used in the detailed description are given to the constituent elements to take advantage of the ease in writing the description. The suffixes may be alternatively used and do not have a distinct difference or role in and by themselves.

FIG. 1 is a block diagram showing a wireless power transmission system according to an exemplary embodiment.

As shown in FIG. 1, the wireless power transmission system according to an exemplary embodiment includes a wireless power transmission apparatus 100 and a wireless power receiving apparatus 200. That is, based on electromagnetic induction, when the wireless power transmission apparatus 100 transmits a wireless power signal to the wireless power receiving apparatus 200, the wireless power receiving apparatus 200 receiving the wireless power signal charges a battery with the power of the wireless power signal or supplies power to electronic equipment connected to the wireless power receiving apparatus 200.

Hereinafter, configuration of each of the wireless power transmission apparatus 100 and the wireless power receiving apparatus 200 will be described.

The wireless power transmission apparatus 100 according to an exemplary embodiment includes a primary core 110, a transmission controller 120 and an alternating current/direct current (AC/DC) converter 130. The primary core 110, i.e., a primary coil, is a device to transmit a power signal to a secondary core 210 of the wireless power receiving apparatus 200 based on electromagnetic induction. According to this exemplary embodiment, two coils including a first transmission coil 111 and a second transmission coil 112 may be adopted.

With reference to FIG. 1 again, the transmission controller 120 to control the primary core 110 may include an object detector 121, a central controller 122, a switching controller 123, a driver 124 and a series resonant converter 125.

The object detector 121 detects a phase change or current value change of the primary core 110 as the primary coil, determines whether the corresponding change is performed by the wireless power receiving apparatus 200, i.e., functions as an identification (ID) checker, and filters and processes a charging state signal transmitted from the wireless power receiving apparatus 200. That is, when an ID signal as a response signal to an ID call signal transmitted via the primary core 110 is received, the object detector 121 filters and processes the ID signal. When a charging state signal including information on a charging voltage or a battery cell during charging is received, the object detector 121 filters and processes the charging state signal.

The central controller 122 receives and checks a determination result of the object detector 121, analyzes the ID signal received in the primary core 110, and transmits a power signal for transmitting a wireless power signal via the primary core 110 to the driver 124. Also, in response to the charging state signal being received from the primary core as described below, the central controller 122 changes the wireless power signal by controlling the driver 124 based on the charging state signal.

The switching controller 123 controls a switching operation between the first transmission coil 111 and the second transmission coil 112 and the series resonant converter 125. The present application adopts two transmission coils but is not limited thereto. Only one coil or multiple coils greater than two may be adopted. When one coil is applied, the switching controller 123 is not required.

The driver 124 controls the operation of the series resonant converter 125 by controlling the central controller 122.

The series resonant converter 125 generates the transmission power to generate a power signal to be transmitted through the control of the driver 124 and supplies the transmission power to the primary core 110. In other words, when the central controller 122 transmits the power controlling signal for transmitting a power signal with a required power value to the driver 124, the driver 124 controls the operation of the series resonant converter 125 corresponding to the transmitted power controlling signal. Also, the series resonant converter 125 applies transmission power corresponding to the required power value to the primary core 110 through the control of the driver 124 to transmit a wireless power signal with a required strength.

In addition, the series resonant converter 125 supplies the power to generate a first object detecting signal and a second object detecting signal via each of the first transmission coil 111 and the second transmission coil 112, respectively, through the control of the driver 124.

An object detecting sensor 126 is installed on a protrusion portion 150 (see FIG. 2) of the wireless power transmission apparatus 100 to check whether a foreign object is placed near a charging position of the wireless power transmission apparatus during wireless charging. An infrared ray sensor may be adopted as the object detecting sensor 126. The infrared ray sensor is a device to detect an object by sensing a chemical or physical quantity such as strength of radiation, pressure, and/or temperature using an infrared ray, and transforming the chemical or physical quantity into a quantity of electricity of a signal-processible form. The infrared ray sensor is classified into an active type infrared ray sensor for sensing change by radiating an infrared ray itself to shield light and an inactive type infrared ray sensor to read only the change of the infrared ray from outside without an emitter. The infrared ray is defined as a radiant ray of wavelength 0.75 μm~1 mm, which is shorter than a microwave and longer than a red light of a visible ray in an electromagnetic spectrum. The infrared ray sensor increases sensitivity and accuracy in comparison with a conventional temperature or ultraviolet sensor. The infrared ray sensor may have a sensing angle of over 120 degrees and a sensing distance of over 20 cm.

An indicator 127 is installed on the protrusion portion 150 to show whether the wireless power transmission is well performed. The indicator 127 may include an emitting device such as a light emitting diode (LED). According to an exemplary embodiment of the present application, two indicators are installed and respectively indicate whether a wireless power transmission signal is normally transmitted via the first transmission coil 111 and the second transmission coil 112.

The wireless power transmission apparatus 100 may further include a temperature circuit unit, i.e., a temperature measuring unit (not shown). The temperature measuring unit prevents the wireless power transmission apparatus from overheating. The temperature measuring unit measures temperature around the wireless power transmission apparatus 100 heated by the first transmission coil 111 or the second transmission coil 112 in the wireless power transmission apparatus.

A specific operation of the transmission controller 120 will be described in detail with reference to FIG. 2 and FIG. 3.

The AC/DC converter 130 is a device to convert an AC power of 220V or 110V into a DC power of a predetermined voltage. As described above, an output voltage value is changed by control of the central controller 122.

The wireless power receiving apparatus 200 receives the power via a power signal and includes the secondary core 210, a rectifier 220, a battery cell module 230, and a reception controller 240. The secondary core 210 generates induction power through receipt of the transmitted power signal. The rectifier 220 rectifies the induced power. The battery cell module 230 is charged with the rectified power. The reception controller 240 controls the secondary core 210, the rectifier 220, and the battery cell module 230. The wireless power receiving apparatus 200 may be a battery pack including a battery cell module or a mobile communication terminal including the battery pack.

The secondary core 210 receives the transmitted wireless power signal transmitted from the primary core 110 of the wireless power transmission apparatus 100.

The rectifier 220 rectifies the induced power received from the secondary core 210 into a DC voltage and maintains a charging state with a charging voltage before starting the charging process.

The battery cell module 230 becomes an object to be charged with the DC power from the rectifier 220 through control of the reception controller 240. The object to be charged may include electronic equipment such as a cellular phone, PMP, MP3, or other electronic device as well as the battery cell module 230. The battery cell module 230 includes protection circuits such as a temperature detecting circuit, and over voltage and over current prevention circuits. The battery cell module 230 also includes a charging management module to collect and process information on a charging state of the battery cell.

The reception controller 240 controls the current of power charged in the rectifier 220 such that the proper current flows in the battery cell module 230.

Figure 2:
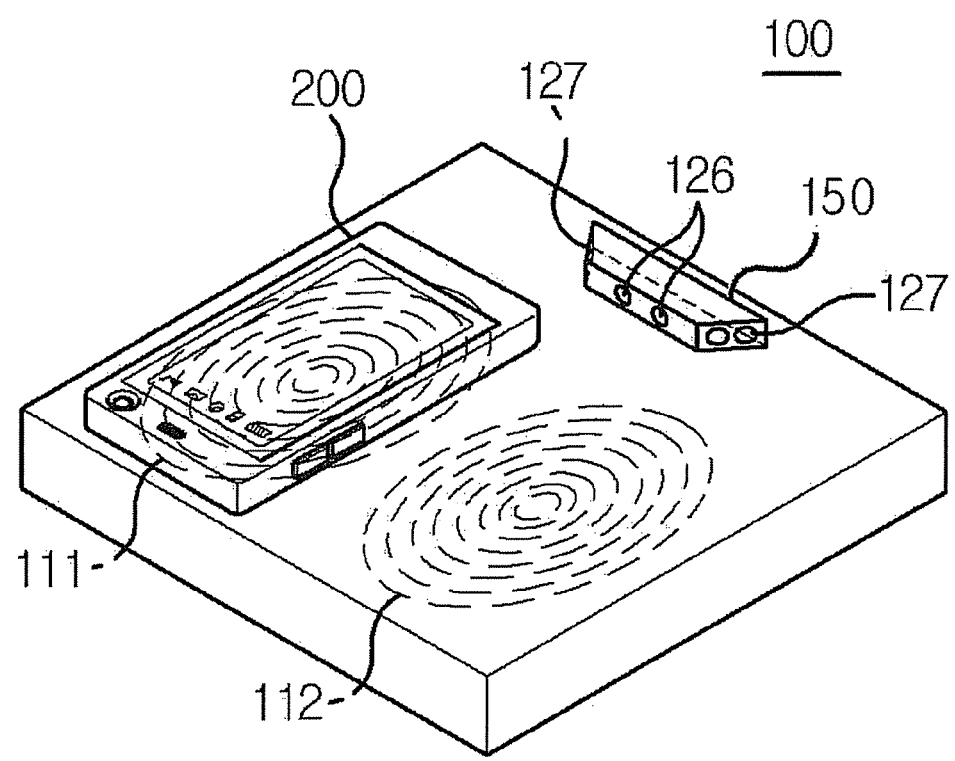
FIG. 2 is a conceptual view describing a detection of a foreign object in a wireless power transmission apparatus according to an exemplary embodiment.

FIG. 2 is a conceptual view describing detection of a foreign object in the wireless power transmission apparatus 100 according to an exemplary embodiment.

As shown in FIG. 2, the first transmission coil 111 and the second transmission coil 112 are installed on a main surface of the wireless power transmission apparatus 100 to be spaced apart from each other. The wireless power receiving apparatus 200 may be placed on the main surface of the wireless power transmission apparatus 100. The wireless power signal is transmitted via any one of the first transmission coil 111 and the second transmission coil 112 according to the position of the wireless power receiving apparatus 200. The reception controller 240 of the wireless power receiving apparatus 200 receiving the wireless power signal charges the battery cell module 230. At this time, the indicator 127 corresponding to a coil outputting the wireless power signal emits light.

When a foreign object such as a coin or a clip is placed on a main surface of the wireless power transmission apparatus during wireless charging, the object detecting sensor 126 installed on the protrusion portion 150 detects the foreign object and calculates a power loss due to the foreign object. When the power loss is over a reference value, the transmission of the wireless power signal is stopped. As shown in FIG. 2, two object detecting sensors 126 may be installed. That is, one object detecting sensor 126 is installed to detect a foreign object on or near the first transmission coil 111 and the other is installed to detect a foreign object on or near the second transmission coil 112.

When the primary core 110 is formed of two overlapped coils, two coils are installed to be overlapped in a longitudinal direction such that the wireless power signal is transmitted to one wireless power receiving apparatus 200. In this case, one object detecting sensor 126 may be installed on the protrusion portion 150.

Hereinafter, a wireless power transmission controlling method in the wireless power transmission apparatus having the above-mentioned configuration will be described in detail with reference to FIG. 3.

Figure 3:
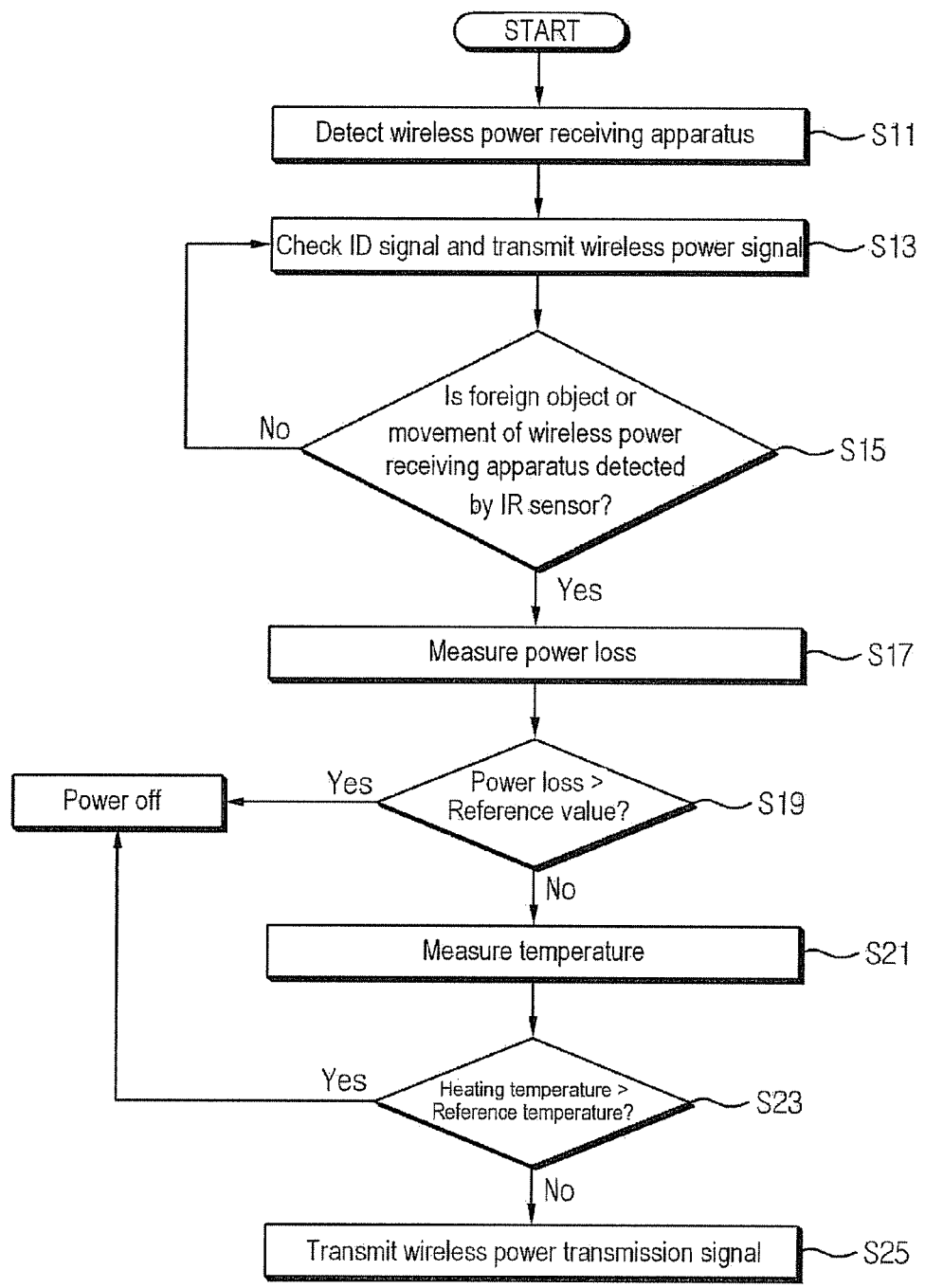
FIG. 3 is a flowchart describing a wireless power transmission controlling method in the wireless power transmission system according to an exemplary embodiment.

FIG. 3 is a flowchart describing the wireless power transmission controlling method in the wireless power transmission apparatus according to an exemplary embodiment.

As shown in FIG. 3, it is detected at operation S11 whether a wireless power receiving apparatus 200 is placed on a charging position of the wireless power transmission apparatus 100 by measuring a phase change or a current value change for a pulse signal transmitted via a primary core 110 of the wireless power transmission apparatus. As shown in FIG. 1 and FIG. 2, when two coils are used as the primary core 110, a pulse signal is transmitted to the second transmission coil 112 and the first transmission coil 111 of the primary core 100 in turns. The phase change or the current value change of the pulse signal which is generated in one of the first transmission coil 111 and the second transmission coil 112 is measured. Subsequently, it is detected whether the wireless power receiving apparatus 200 is placed on one of the first transmission coil 111 and the second transmission coil 112 based on the phase change or the current value change.

As described above, when the wireless power receiving apparatus 200 is placed on the charging position, the transmission controller 120 of the wireless power transmission apparatus 100 checks an ID signal of the wireless power receiving apparatus 200 received from the primary core 110. Accordingly, a wireless charging is started at operation 513 by starting transmission of the wireless power signal via the primary core 110. Subsequently, the object detecting sensor 126 detects whether a foreign object is placed on or near a charging position of the wireless power transmission apparatus 100 during wireless charging at operation S15. Otherwise, the object detecting sensor 126 detects at operation S15 whether the wireless power receiving apparatus 200 deviates or moves from the charging position.

When the object detecting sensor 126 detects the foreign object, the transmission controller of the wireless power transmission apparatus measures a power loss at operation S17. The power loss may be calculated as an absolute value, which is a value obtained by subtracting power used in actual charging from power for transmitting a wireless power transmission signal, or calculated as a transmission efficiency. That is, the power loss may be measured based on a charging state signal including charging speed, charging power, and battery charging quantity information transmitted from the wireless power receiving apparatus 200.

When the measured power loss is over a reference value at operation S19, the transmission controller 120 of the wireless power transmission apparatus 100 turns power off to prevent transmission of the wireless power transmission signal and power loss.

At operation S21, if the measured power loss is over the reference value, temperature measuring unit of the wireless power transmission apparatus measures a heating temperature on a main surface of the wireless power transmission apparatus 100. At operation S23, if the heating temperature is over the reference temperature, the wireless power transmission apparatus 100 is turned off by the central controller 122 to stop the wireless charging. If the measured heating temperature is lower than the reference temperature, the wireless power transmission signal is normally transmitted at operation S25.

According to an exemplary embodiment of the present document having the configuration described above, the foreign object existing between the wireless power transmission apparatus and the wireless power receiving apparatus during the wireless charging or before starting the wireless charging may be detected. Accordingly, a wireless power transmission efficiency may be improved by controlling a wireless power transmission.

It will be apparent to those skilled in the art that the wireless power transmission apparatus and the wireless power transmission controlling method thereof may not be limitedly applied by the constitution and the method of the above-mentioned exemplary embodiments. All or the part of the exemplary embodiments may be selectively combined and configured to realize diverse modifications.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for controlling a power transmission in a wireless power transmission apparatus, the method comprising:
    detecting whether a wireless power receiving apparatus is placed on or near the charging position by measuring a phase change or a current value change for a pulse signal transmitted via a primary core of the wireless power transmission apparatus;
    starting a wireless charging by transmitting a wireless power signal to the wireless power receiving apparatus;
    detecting via an object detecting sensor whether a foreign object is placed on or near a charging position of the wireless power transmission apparatus during the wireless charging;
    calculating a power loss of the wireless charging by a controller of the wireless power transmission apparatus if the foreign object is detected by the object detecting sensor; and
    stopping the wireless charging if the power loss is over a reference value,
    wherein the detecting of whether the wireless power receiving apparatus is placed on or near the charging position by measuring the phase change or the current value change for the pulse signal transmitted via the primary core of the wireless power transmission apparatus, comprises:
    transmitting the pulse signal to a first transmission coil and a second transmission coil of the primary core in turns;
    measuring the phase change or the current value change of the pulse signal which is generated in one of the first transmission coil and the second transmission coil; and
    detecting whether the wireless power receiving apparatus is placed on one of the first transmission coil and the second transmission coil, based on the phase change or the current value change.

2. The method of claim 1, wherein the object detecting sensor is an infrared ray sensor.

3. The method of claim 2, wherein the infrared ray sensor has a sensing angle over 120 degrees, and a sensing distance over 20 cm.

4. The method of claim 1, further comprising:
    measuring a heating temperature of the wireless power transmission apparatus if the power loss is less than or equal to the reference value; and
    stopping the wireless charging if the heating temperature is over a reference temperature.

5. The method of claim 1, wherein the calculating of the power loss of the wireless charging by the controller of the wireless power transmission apparatus if the foreign object is detected by the object detecting sensor, comprises:
    calculating the power loss using a charging state information transmitted from the wireless power receiving apparatus.

6. A wireless power transmission apparatus, comprising:
    a primary core to transmit a wireless power signal;
    a transmission controller detects whether a wireless power receiving apparatus is placed on the charging position by measuring a phase change or a current value change for a pulse signal transmitted via the primary core of the wireless power transmission apparatus, and to start a wireless charging by transmitting a wireless power signal if the wireless power receiving apparatus is placed on or near the charging position; and an object detecting sensor to detect a foreign object during the wireless charging; and wherein the transmission controller to calculate a power loss of the wireless charging if the foreign object is detected by the object detecting sensor during the wireless charging, and to stop the wireless charging if the power loss is over a reference value, wherein:

the primary core comprises a first transmission coil and a second transmission coil; and the transmission controller transmits the pulse signal to the first transmission coil and the second transmission coil of the primary core in turns, to measure the phase change or the current value change of the pulse signal which is generated in one of the first transmission coil and the second transmission coil, and detect that the wireless power receiving apparatus is placed on one of the first transmission coil and the second transmission coil, based on the phase change or the current value change.

7. The apparatus of claim 6, wherein the object detecting sensor is an infrared ray sensor.

8. The apparatus of claim 7, wherein the infrared ray sensor has a sensing angle over 120 degrees, and a sensing distance over 20 cm.

9. The apparatus of claim 7, wherein the object detecting sensor is installed on a protrusion portion formed at one side of the wireless power transmission apparatus.

10. The apparatus of claim 9, further comprising: an indicator installed on the protrusion portion to show that the wireless charging works normally.

11. The apparatus of claim 6, further comprising:

a temperature measuring unit to measure a heating temperature in the wireless power transmission apparatus if the power loss is less than or equal to the reference value;

wherein the transmission controller stops the wireless charging if the heating temperature is over the reference temperature.

12. A wireless power transmission system comprising:

a wireless power transmission apparatus comprising:

a primary core to transmit a wireless power during wireless charging, a transmission controller detects whether a wireless power receiving apparatus is placed on the charging position by measuring a phase change or a current value change for a pulse signal transmitted via the primary core of the wireless power transmission apparatus, and to start a wireless charging by transmitting a wireless power signal if the wireless power receiving apparatus is placed on or near the charging position, an object detecting sensor to detect a foreign object during the wireless charging, wherein the transmission controller to calculate a power loss of the wireless charging if the foreign object is detected during the wireless charging, and to alter the wireless charging if the power loss is over a reference value, wherein the primary core comprises a first transmission coil and a second transmission coil, and wherein the transmission controller transmits the pulse signal to the first transmission coil and the second transmission coil of the primary core in turns, to measure the phase change or the current value change of the pulse signal which is generated in one of the first transmission coil and the second transmission coil, and detect that the wireless power receiving apparatus is placed on one of the first transmission coil and the second transmission coil, based on the phase change or the current value change; and the wireless power receiving apparatus which receives the wireless power from the primary core.

13. The wireless power transmission system of claim 12, wherein the object detecting sensor detects whether the foreign object is on or near a charging position of the wireless power transmission apparatus and the wireless power receiving apparatus receives the wireless power from the primary core when the wireless power receiving apparatus is on or near the charging position of the wireless power transmission apparatus.

* * * * *